United States Patent
Paterno

(10) Patent No.: US 6,269,114 B1
(45) Date of Patent: Jul. 31, 2001

(54) MONITOR PARTICULARLY SUITED FOR NAVAL TACTICAL DATA SYSTEM (NTDS) INTERFACES TYPES A AND B

(75) Inventor: Robert M. Paterno, Orange, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/047,335

(22) Filed: Mar. 25, 1998

(51) Int. Cl.[7] ....................................................... H04B 3/46
(52) U.S. Cl. ......................... 375/224; 702/120; 702/121; 702/122
(58) Field of Search .................................. 375/224, 213, 375/257; 702/120, 122, 121, 126; 710/18, 19

(56) References Cited

U.S. PATENT DOCUMENTS

| | | | |
|---|---|---|---|
| 3,739,098 | * | 6/1973 | Camiciottoli et al. ................. 179/15 |
| 3,920,973 | * | 11/1975 | Avellar et al. ................... 235/151.31 |
| 4,736,402 | * | 4/1988 | Landis ..................................... 379/16 |
| 5,040,111 | * | 8/1991 | Al-Salameth et al. ............... 365/200 |
| 5,323,256 | | 6/1994 | Banks .................................... 359/147 |
| 5,388,210 | | 2/1995 | Clayton et al. ...................... 395/200 |
| 5,406,091 | | 4/1995 | Burba et al. ......................... 250/551 |
| 5,467,369 | * | 11/1995 | Vijeh et al. ........................... 375/224 |
| 5,533,053 | * | 7/1996 | Hershbarger ......................... 375/257 |
| 5,614,896 | | 3/1997 | Monk et al. .......................... 340/945 |
| 5,657,346 | * | 8/1997 | Lordi et al. ........................... 375/224 |
| 5,661,583 | | 8/1997 | Nhu ....................................... 359/173 |
| 5,896,415 | * | 4/1999 | Owens et al. ........................ 375/224 |

* cited by examiner

Primary Examiner—Stephen Chin
Assistant Examiner—Mohammad Ghayour
(74) Attorney, Agent, or Firm—James B. Bechtel, Esq.; John P. McMahon, Esq.

(57) ABSTRACT

A monitor is disclosed that presents a negligible load to a hardwired interface, provides electrical isolation between all of the interconnected equipment, adds no significant delay to the interface data, provides for maximum reliability of interface operation, provides for remote operation of the monitoring function, provides for noise immune reception of interface data, maintains interface controlled impedance, provides for ease of installation, and does not perturb system operation in any significant way.

11 Claims, 3 Drawing Sheets

MONITOR PARTICULARLY SUITED FOR NAVAL TACTICAL DATA SYSTEM (NTDS) INTERFACES TYPES A AND B

STATEMENT OF GOVERNMENT INTEREST

The invention described herein may be manufactured and used by or for the Government of the United States of America, for governmental purposes, without the payment of any royalty thereof or therefor.

BACKGROUND OF THE INVENTION

The present invention relates to the monitoring, more particularly, to a monitor having an interface which is hardwired and interposed between first and second digital equipments that exchanges the digital information therebetween and the monitor routes the digital information to means for capturing, recording, and analyzing the routed digital signals.

An increasing complexity of computerized systems has created a need for a concomitant developmental engineering evaluation equipment for monitoring computer interfaces, such as the interfaces found in military installations that employ a Naval Tactical Data System (NTDS) protocol. The NTDS protocol comprises a parallel transmission technique conforming to military specifications, such as military standard, input/output interfaces, standard digital data, Navy systems, MIL-Standard-1397C, herein incorporated by reference and which defines and describes the parameters of the Naval Tactical Data System (NTDS) interfaces which are of particular importance to the present invention. Systems which meet the requirements of military specifications are known and one such system is described in U.S. Pat. No. 5,661,583 which is herein incorporated by reference.

A monitoring activity may be conducted for such practices as verifying proper computer control of a sensor, developing algorithms for data processing, verifying system performance, and other tasks related to computerized system development, acceptance, or improvement. The physical parameters of the environment in which the monitoring activity is conducted, especially for NTDS interfaces, varies from a relatively benign laboratory setting to the more severe shipborne embedded installations. Similarly, the range of cost factors that accompanies the monitoring activity varies from the relatively inexpensive laboratory testing to the expensive and critical data collection missions aboard a Navy vessel.

The monitoring activity typically involves routing digital data under consideration to means for capturing, recording and analyzing the digital data, such as that described in U.S. Pat. No. 5,614,896 which is herein incorporated by reference. This capturing, recording and analyzing means is commonly referred to as an instrumentation system, which terminology is used herein.

Various attempts to provide equipment for monitoring the activity for a NTDS interface have been made, but each suffered a shortcoming with respect to disturbing the interface or computerized system under the test. One such attempt involved a so-called "three-way cable tap" which involved the installing of cabling between first digital equipment (generally referred to as a source), second digital equipment (generally referred to as a destination), and the instrumentation system. This technique yielded a common interface between the source, destination and instrumentation systems. Experience has shown that the lack of ground isolation between the source and destination equipment and instrumentation system can disrupt the interface under test. For example, electrical noise undesirably created in the instrumentation system can disadvantageously find its way onto the common interface, and, then, into the source and destination equipment. Other problems with this approach involve distortion of the controlled impedance of the signal carrying conductors of the NTDS interface created by the impedance loading effects of the instrumentation system on the NTDS interface.

Another attempt to provide for the monitoring activity for the NTDS interface does not involve any hardwired interface between the involved equipment, but rather is handled by providing a dedicated output channel of the computerized equipment being monitored and analyzed. The dedicated channel provides associated output digital information directly to the instrumentation system. This approach eliminates the grounding and impedance loading problems, but is expensive in that it consumes a data channel of the computerized equipment being analyzed. It is desired that means be provided for routing the data being exchanged over a digital interface between first and second digital equipments to an instrumentation system without causing any impedance loading or ground problems, or any data distortion, while at the same time not consuming a dedicated data channel of either of first or second digital equipment under analysis.

SUMMARY OF THE INVENTION

The present invention is directed to a monitor interposed between first and second digital equipments and routing the information exchanged between the first and second digital equipments to an instrumentation system, without causing any disruption of the digital data and without causing any undesired loading of the instrumentation system onto the interface between the first and second digital equipment.

The monitor is interposed between the first and second digital equipments that communicate with each other by digital signals respectively carried by first and second connectors each comprised of conductors. The digital signals is defined and controlled by a first protocol, preferably a NTDS protocol. The monitor comprises joining means, an input stage and an output stage. The joining means has direct-current conductivity to each of the conductors of the first and second connectors so as to form a hardwired interface between the monitor and the first and second digital equipments. The input stage has receiving means connected to the joining means and utilizing logic levels compatible with the first protocol. The receiving means provides output signals. The output stage has optoelectronic devices that receive the output signals of the receiving means and provides output signals serving as the output signals of the monitor.

OBJECTS OF THE INVENTION

It is a primary object of the present invention to provide a monitor interposed between first and second digital equipments for routing the digital signals being exchanged between the first and second digital equipments to an instrumentation system.

It is a further object of the present invention to provide a monitor that does not disturb the system being monitored in function, operation or performance.

It is another object of the present invention to provide for a monitor that allows data to be collected which are true representations of the actual computerized system performance being monitored, while at the same time does not compromise the operation of the computerized system being monitored.

Another object of the present invention is to provide a monitor that ensures for maximum reliability with respect to continued operation of the computerized system being monitored.

Further still, it is an object of the present invention to provide for a monitor that when encountering any failing condition does not affect the operation of the computerized system being monitored.

Other objects, advantages and novel features of the invention will become apparent from the following detailed description when considered in conjunction with the accompanying drawings therein.

DETAILED DESCRIPTION OF THE PREFERRED EMBODIMENTS

Figure 1:
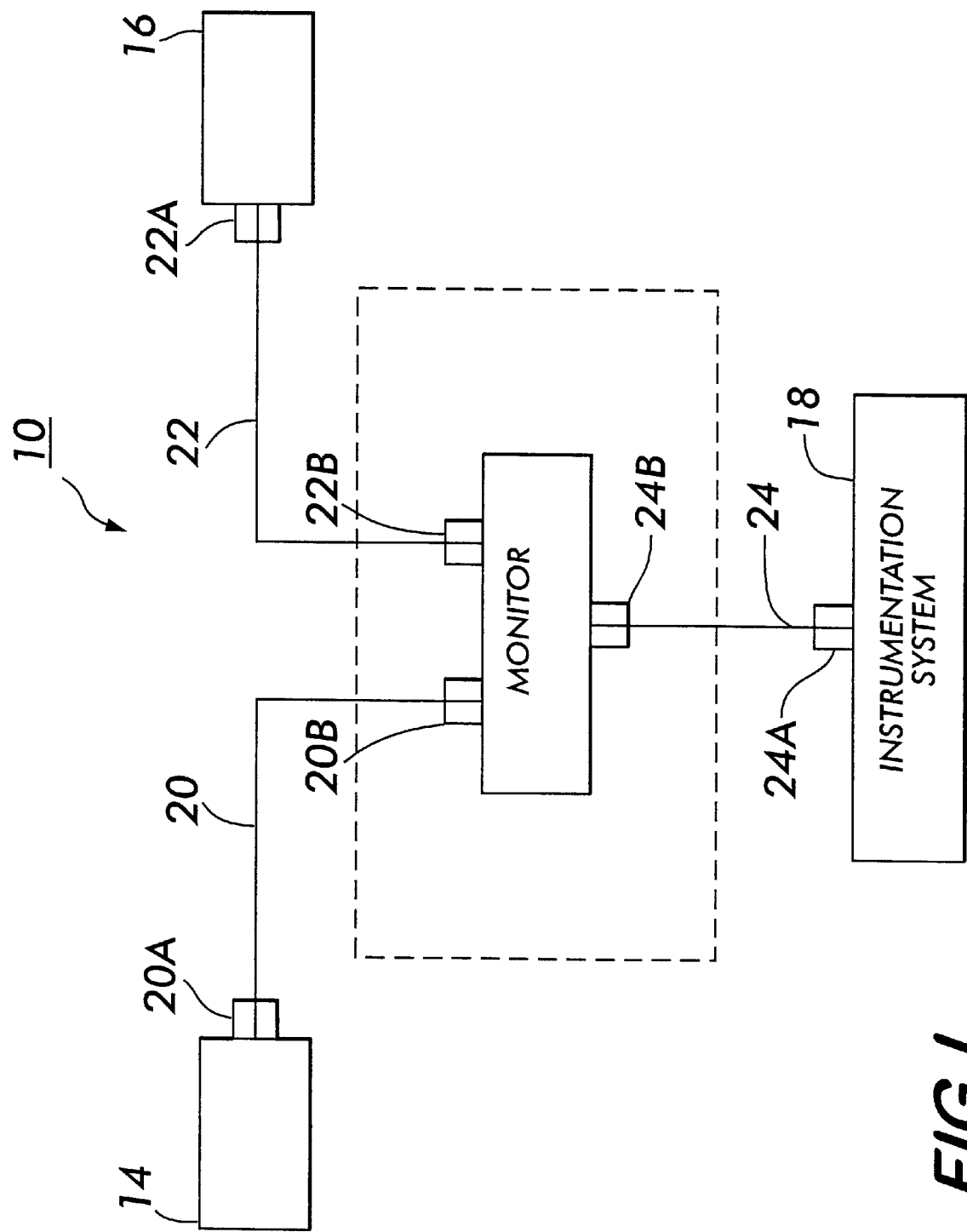
FIG. 1 is a block diagram illustrating the monitor of the present invention interposed between first and second digital equipment and providing output signals to an instrumentation system.

Referring now to the drawings, wherein the same reference number indicates the same element throughout, there is shown in FIG. 1 an arrangement 10, wherein a monitor 12, which is of primary importance to the present invention, is interposed between first and second digital equipments 14 and 16, respectively, that communicate with each other by digital signals, and wherein such digital signals are routed to an instrumentation system 18 by way of the monitor 12.

The monitor 12 allows for monitoring activities to be conducted for analysis purposes, verifying proper computer control, developing algorithms for data processing, verifying system performance, and other tasks related to the computerized system made up of either or both of first and second digital equipments 14 and 16 respectively.

The first and second digital equipments 14 and 16, respectively, may form a communication network particularly suited for military installations that employed a first protocol, which may be a NTDS protocol defined by military specification, MIL-Standard-1397C previously mentioned, and which is applicable to Naval Tactical Data System (NTDS) which is of importance to the present invention. The NTDS protocols involve various interfaces, wherein Types A and B NTDS interfaces are of particular importance to the present invention. The first and second digital equipments 14 and 16 are interchangeably referred to herein as NTDS equipments 14 and 16, respectively.

The NTDS equipment 14 may serve as the source/destination digital equipment know in the art, whereas the NTDS equipment 16 may serve as the destination/source equipment, also known in the art. The monitor 12 is connected to NTDS equipment 14 by way of cable 20 having connectors 20A and 20B and is connected to NTDS equipment 16 by way of cable 22 having connectors 22A and 22B. Furthermore, the monitor 12 is connected to the instrumentation system 18 by way of cable 24 having connectors 24A and 24B. The cables 20, 22 and 24, as well as the connectors 20A, 20B, 22A, 22B, 24A and 24B, may be those cables and connectors defined by MIL-Standard-1397C.

The instrumentation system 18 serves as the means for capturing/recording/analyzing the digital signals being exchanged between the NTDS equipments 14 and 16. The instrumentation system may comprise means for capturing and recording a plurality of data transmissions occurring between the NTDS equipments 14 and 16, and means for analyzing the data transmissions for the developmental engineering purposes or for fault analysis purposes. The instrumentation system receives by way of monitor 12 the digital information shared by the NTDS equipments 14 and 16. The interconnections of the monitor 12 to the NTDS equipment 14 and 16, as well as to the instrumentation system 18, may be further described with reference to FIG. 2.

Figure 2:
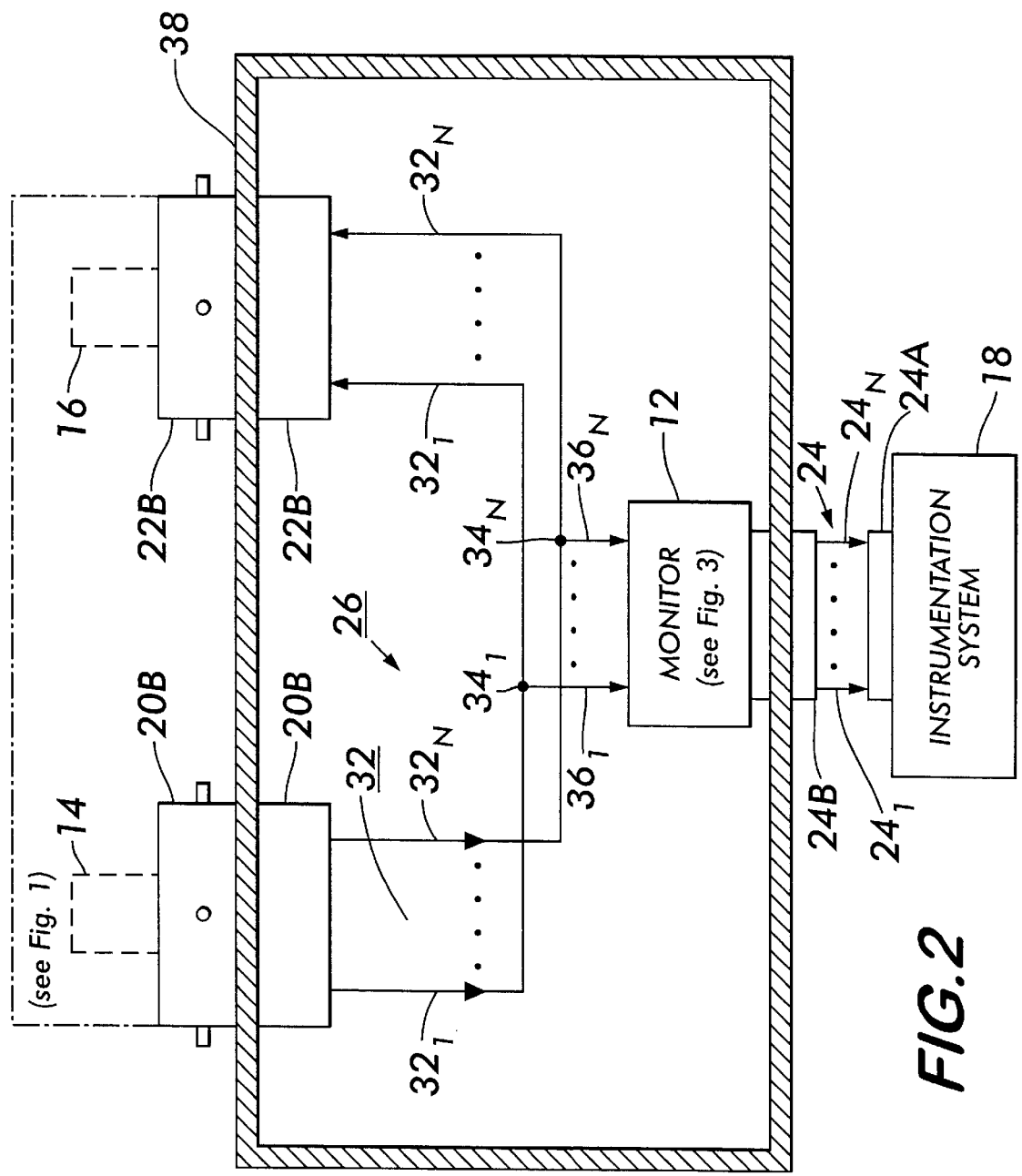
FIG. 2 illustrates the details of the hardwired interface between the monitor and the first and second digital equipments of FIG. 1.

In general, FIG. 2 illustrates joining means 26 comprised of connectors 20B and 22B, cable 32 comprised of individual conductors $32_1 \ldots 32_N$, connection means $34_1 \ldots 34_N$, and wires $36_1 \ldots 36_N$. The connectors 20B and 22B are panel mounted connectors mounted on a frame 38 of monitor 12. The connectors 20B and 22B are electrically connected to each other by way of cable 32 respectively carry the digital signals being exchanged between NTDS equipments 14 and 16, each of which signals is being carried by a respective conductor $32_1 \ldots$ or $32_N$.

The joining means 26 has direct current conductivity to each of the conductors $32_1 \ldots 32_N$ by the operation of appropriate means $34_1 \ldots 34_N$, respectively, such as a crimp tap end, a solder connection or some of similar means. The direct-current conductivity $34_1 \ldots 34_N$ means provides a hardwired interface between the monitor 12 and each of the NTDS equipments 14 and 16. More particularly, as seen in FIG. 2, the monitor 12, and NTDS equipments 14 and 16 share the same common interface, whereby the joining means 26 of the monitor 12 is directly, via appropriate cables and connectors, connected to each of NTDS equipments 14 and 16. Conversely, as also seen in FIG. 2, the instrumentation system 18 is connected to the monitor 12 via cable 24 and connectors 24A and 24B, but has no direct connection to either of the NTDS equipments 14 or 16.

As further seen in FIG. 2, the monitor 12 is connected to the NTDS equipment 14 and 16 in a very reliable manner in that it is essentially connected by means of feedthrough cabling, whose quality of connection is only dependent upon the ability to provide for the direct-current conductivity means $34_1 \ldots 34_N$. The monitor 12 does not reduce the reliability of the continued operation of the data interchange between digital equipment 14 and 16 as well as does not reduce the reliability of the monitor 12 connection to the equipments 14 and 16. More particularly, the reliability degradation of the monitor 12 is only dependent on the quality of the connection between NTDS equipments 14 and 16 which, in turn, is only dependent upon the ability to provide for the direct-current conductivity means $32_1 \ldots 32_N$; and that there is no dependence upon any active electronics of the monitor 12 for the establishment of this connection. Furthermore, because of the hardwired interface, the monitor 12 does not delay, in any significant manner, the data being exchanged between the NTDS equipments 14 and 16. Any delay that might be present is due to the internal feedthrough cabling, that is, the length of cabling encompassed by conductors $32_1 \ldots 32_N$. It is preferred that the wires $36_1 \ldots 36_N$, which route the data being exchanged between the NTDS equipments 14 and 16 to the monitor 12, have a length which is less than about 0.5 inches.

In general, and as will be further described, the monitor 12 employs bandlimited and low noise electronic components throughout in order to prevent coupling of any noise created by the monitor 12 back onto the digital interface between the NTDS equipments 14 and 16. The monitor 12 includes the joining means 26 that comprises an impedance match between monitor 12 and connecting cables 20 and 22 so that no distortion or reflection of the digital data interchanged between NTDS equipments 14 and 16 occurs as a result of the interposition of monitor 12. Furthermore, the monitor 12 provides electronic devices that consume relatively low power from the hardwired interface between the NTDS equipments 14 and 16, while at the same time provide electrical isolation between the instrumentation system 18 and the NTDS equipments 14 and 16. The monitor 12 may be further described with reference to FIG. 3.

Figure 3:
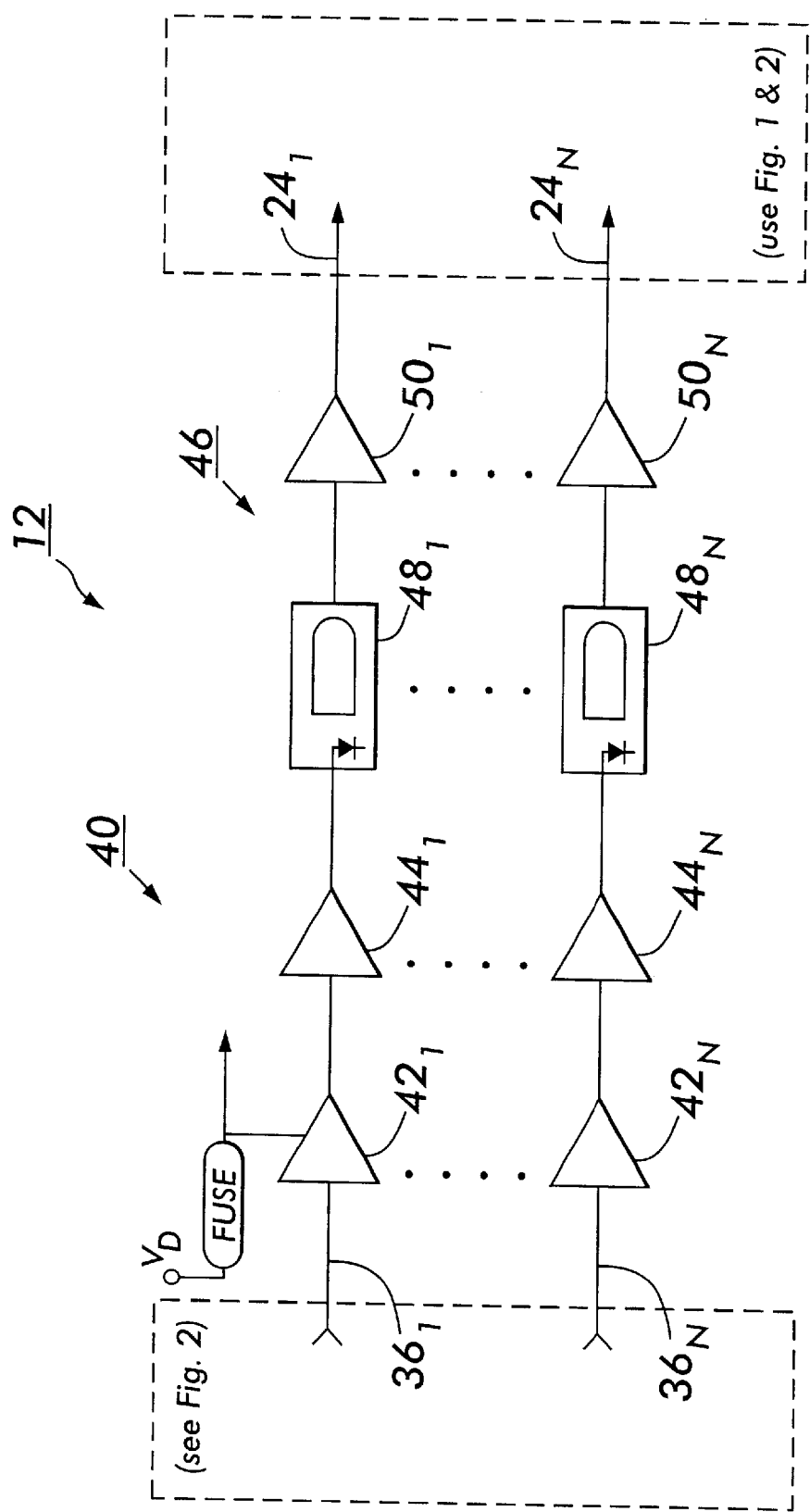
FIG. 3 is a schematic of the monitor of FIG. 1.

The monitor 12 comprises an input stage 40 that has a serial arrangement of buffers $42_1 \ldots 42_N$ and comparators $44_1 \ldots 44_N$ with a comparator and buffer being provided for each of the wires or conductors $36_1 \ldots 36_N$ carrying its respective digital signal. The monitor 12 further comprises an output stage 46 comprised of a serial arrangement of optical couplers $48_1 \ldots 48_N$ and a driver $50_1 \ldots 50_N$. As seen in FIG. 3, each of the conductors $36_1 \ldots 36_N$ are provided with separate elements 42, 44, 48 and 50 so that the monitor 12 is connected in parallel with the NTDS equipments 14 and 16.

The input stage 40 serves as means for receiving digital signals of the interface shared by the NTDS equipments 14 and 16, is connected to the joining means 26 of FIG. 2 by means of the wires $36_1 \ldots 36_N$ and utilizes logic levels that are compatible with the first protocol, that is, preferably the NTDS protocol associated with NTDS types A and B interfaces. The input stage 40, in addition to providing high input impedance that is presented to the NTDS interface between the NTDS equipments 14 and 16 so as not to disturb the impedance match of the joining means 26, provides output signals that are routed to the optical electronic devices, that is, to the optical couplers $48_1 \ldots 48_N$ of the output stage 46. The output stage 46 provides output signals serving as output signals of the monitor 12 which are routed to the instrumentation system 18 by way of the conductors $24_1 \ldots 24_N$ of cable 24.

The buffers $42_1 \ldots 42_N$ serve as amplifiers that are used primarily to present a very high impedance between the monitor 12 and the NTDS equipments 14 and 16, and to isolate the monitor 12 from interacting with the NTDS equipments 14 and 16. The buffers $42_1 \ldots 42_N$ provide a negligible system loading by preferably employing junction field effect transistor (JFET) devices which, as known in the art, require negligible input current for their operation. In this way, there is little or no possibility of disrupting the desired operation of NTDS equipment 14 or 16 by the imposition therebetween of the monitor 12 operating to gather and route data to the instrumentation system 18.

The comparators $44_1 \ldots 44_N$ are preferably those defined and specified by MIL-Standard-1397C and compare threshold levels present at their inputs against the desired specified switching thresholds for the NTDS interface. The use of the comparators $44_1 \ldots 44_N$, as well as the buffers $42_1 \ldots 42_N$, prevents low or any noise involved with the operation of the monitor 12 from finding its way to the interface between the NTDS equipments 14 and 16. Furthermore, unless a match exists between the comparators $44_1 \ldots 44_N$ threshold levels, the comparators $44_1 \ldots 44_N$ are not rendered conductive and do not pass digital signals to the respective optical couplers $48_1 \ldots 48_N$.

The optical couplers $48_1 \ldots 48_N$ receive the information from the comparators $44_1 \ldots 44_N$ and provide optical electronic isolation for eliminating any electrical conductive connection between the NTDS equipments 14 and 16, the monitor 12, and the instrumentation system 18, each having its own separate electrical ground connection. This freedom of the ground connections between equipments 12, 14, 16 and 18 eliminates the undesirably normally occurring ground loop currents which, in turn, undesirably provide for potentially disruptive noise that would otherwise be induced back onto the NTDS interface between the NTDS equipments 14 and 16.

The drivers $50_1 \ldots 50_N$ are preferably NTDS drivers using transistor-transistor-logic (TTL) voltage levels and whose operation are defined by the MIL-Standard-1397C. The drivers $50_1 \ldots 50_N$ allow for the monitor 12 to be remotely located from the instrumentation system 18 by a relatively large amount, such as that specified in the MIL-Standard-1397C. This feature allows for a convenient placement of the instrumentation system 18 relative to the NTDS equipment 14 and 16. Furthermore, the drivers $50_1 \ldots 50_N$ provide a controlled impedance that is presented to the instrumentation system 18 and, thereby prevent any undesired reflections from the instrumentation system 18 from finding its way back onto the NTDS equipments 14 and 16.

The monitor 12 further comprises a fuse 52 having a predetermined prescribed level of rupturing current so as to protect and prevent damage to the monitor 12 during any overload condition. More importantly, the fuse 52, having connections that are only partially schematically shown, prevents any catastrophic component failure internal of the monitor 12 from creating any damage to the primary equipment, that is, the NTDS equipment 14 and 16. More particularly, the internal fusing of the monitor 12 prevents any power disruption of the system by the operation of monitor 12.

It should now be appreciated that the practice of the present invention provides for a monitor 12 having an interface which is hardwired and interposed between the NTDS equipments 14 and 16. The monitor 12 routes the information being exchanged between the NTDS equipments 14 and 16 to the instrumentation system 18. The monitor 12 employs low power consuming components, while at the same time provides electrical isolation between the NTDS equipments 14 and 16 and the instrumentation system 18.

Obviously, many modifications and variations of the present invention are possible in light of the foregoing teaching. It is, therefore, to be understood that within the scope of the appended claims the invention may be practiced otherwise than as specifically described.

What I claim is:

1. A monitor interposed between first and second digital equipments that communicate with each other by digital signals respectively carried by first and second connectors and each comprised of conductors, said digital signals being defined and controlled by a first protocol, said monitor comprising:
(a) joining means having direct-current conductivity to each of said conductors of said first and second connectors so as to form a hardwired interface between the monitor and the first and second digital equipments;
(b) an input stage having receiving means connected to said joining means and utilizing logic levels compatible with said first protocol, said receiving means providing output signals; and
(c) an output stage having optoelectronic devices receiving said output signals of said receiving means and providing output signals serving as output signals of said monitor.

2. The monitor according to claim 1, wherein said first protocol is a Naval Tactical Data System (NTDS) protocol.

3. The monitor according to claim 2, wherein said NTDS protocol is one of Types A and B interfaces.

4. The monitor according to claim 2, wherein said joining means is connected to each of said conductors by a crimp.

5. The monitor according to claim 2, wherein said receiving means is connected to said joining means by individual wires each having a length of less than about 0.5 inches.

6. The monitor according to claim 2, wherein said input stage comprises a serial arrangement of a buffer and a comparator for each of said conductors.

7. The monitor according to claim 6, wherein said buffer comprises a junction field effect transistor (JFET).

8. The monitor according to claim 2, wherein said output stage comprises a serial arrangement of an optical coupler and a driver for each of said conductors.

9. The monitor according to claim 8, wherein said driver is transistor-transistor-logic (TTL) compatible.

10. The monitor according to claim 8, wherein said optical couplers receive said output signals from said receiving means.

11. The monitor according to claim 1 further comprising a fuse having a predetermined prescribed level for protecting said monitor.

* * * * *